United States Patent [19]
Isoai et al.

[11] Patent Number: 5,378,380
[45] Date of Patent: Jan. 3, 1995

[54] PROCESS FOR PRODUCING ACICULAR GEOTHITE PARTICLES AND ACICULAR MAGNETIC IRON OXIDE PARTICLES

[75] Inventors: Masaru Isoai; Tosiharu Harada; Tokihiro Kurata; Kazuhiro Fujita; Kazushi Takama; Shigekazu Jikuhara, all of Hiroshima, Japan

[73] Assignee: Toda Kogyo Corp., Hiroshima, Japan

[21] Appl. No.: 22,847

[22] Filed: Feb. 25, 1993

Related U.S. Application Data

[62] Division of Ser. No. 733,726, Jul. 22, 1991, abandoned.

[30] Foreign Application Priority Data

May 31, 1991 [JP] Japan ................................. 3-157829
May 31, 1991 [JP] Japan ................................. 3-157830

[51] Int. Cl.⁶ ........................ C01G 49/06; C01G 49/08
[52] U.S. Cl. ............................... 252/62.56; 252/62.62;
423/632; 423/633; 423/634; 427/127; 427/128
[58] Field of Search ..................... 423/632, 633, 634;
252/62.56, 62.62; 427/128, 127

[56] References Cited

U.S. PATENT DOCUMENTS

| 3,946,103 | 3/1976 | Hund | 423/633 |
| 4,033,891 | 7/1977 | Matsui et al. | 252/62.56 |
| 4,136,049 | 1/1979 | Horishi et al. | 252/62.56 |
| 4,136,158 | 1/1979 | Okuda et al. | 423/632 |
| 4,495,164 | 1/1985 | Okuda et al. | 423/632 |
| 4,873,010 | 10/1989 | Takedoi et al. | 252/62.59 |

FOREIGN PATENT DOCUMENTS

| 3631193 | 3/1988 | Germany | 423/632 |
| 59-128295 | 7/1984 | Japan | 423/633 |
| 60-195023 | 10/1985 | Japan | 423/632 |
| 61-168536 | 7/1986 | Japan | 423/632 |
| 61-186225 | 8/1986 | Japan | 423/632 |
| 62-223022 | 10/1987 | Japan | 423/633 |
| 64-42329 | 2/1989 | Japan | 423/632 |

Primary Examiner—Jack Cooper
Attorney, Agent, or Firm—Nixon & Vanderhye

[57] ABSTRACT

Disclosed herein are a process for producing acicular goethite particles comprising the step of: blowing an oxygen-containing gas into a ferrous salt reaction solution containing colloidal ferrous hydroxide or iron-containing colloidal precipitates which is obtained by reacting an aqueous ferrous salt solution with less than one equivalent of an aqueous alkali hydroxide solution, an aqueous alkali carbonate solution, or an aqueous alkali hydroxide and alkali carbonate solution based on $Fe^{2+}$ in said aqueous ferrous salt solution, in the presence of ascorbic acid or a salt thereof so as to oxidize said colloidal ferrous hydroxide or iron-containing colloidal precipitates and to produce acicular goethite particles throught green rust; and a process for producing acicular magnetic iron oxide particles by reducing the acicular goethite particles obtained in the above process to produce acicular magnetite particles, and if necessary, oxidizing the acicular magnetite particles to obtain acicular maghemite particles, and if necessary, modifying the acicular magnetite or maghemite particles with Co or Co and $Fe^{2+}$.

12 Claims, 4 Drawing Sheets ( x 30000 )

( x 30000 )

(x 30000)

(x 30000)

( x 30000 )

( x 30000 )

( x 30000 )

(x 30000)

PROCESS FOR PRODUCING ACICULAR GEOTHITE PARTICLES AND ACICULAR MAGNETIC IRON OXIDE PARTICLES

This is a division of application Ser. No. 07/733,726, filed Jul. 22, 1991, now abandoned.

BACKGROUND OF THE INVENTION

The present invention relates to a process for producing acicular goethite particles which are suitable as a starting material for magnetic particles for magnetic recording, and which have a uniform particle size distribution, are substantially free of dendrites and have a large aspect ratio (major axial diameter/minor axial diameter). The present invention also relates to a process for producing acicular magnetic iron oxide particles which have a uniform particle size distribution, are substantially free of dendrites, and have a large aspect ratio (major axial diameter/minor axial diameter) and an excellent coercive force distribution.

With progressing miniatirization and weight-reduction of magnetic recording and reproducing apparatuses in recent years, the necessity for a recording medium having a higher performance such as a magnetic tape and a magnetic disk has been increasing more and more. In other words, a magnetic recording medium is required to have a higher recording density, higher sensitivity and higher output characteristic. The magnetic characteristics of magnetic particles which are demanded in order to satisfy the above-mentioned requirements for the magnetic recording medium, are a high coercive force and an excellent dispersibility.

In order to improve the sensitivity and the output of a magnetic recording medium, the magnetic particles must have as high a coercive force as possible. This fact is described in, for example, DEVELOPMENT OF MAGNETIC MATERIALS AND TECHNIQUE OF IMPROVING THE DISPERSION PROPERTY OF MAGNETIC POWDER (1982), published by K.K. Sogo Gijutsu Kaihatsu Center, p. 310: "Since the improvement of magnetic tapes has been directed toward a higher sensitivity and a higher output, it is an important point to enhance the coercive force of acicular $\gamma$-$Fe_2O_3$ particles, . . . "

In order to improve the recording density of a magnetic recording medium, the magnetic recording medium must have a high coercive force and a large residual magnetization (Br), as described in the said DEVELOPMENT OF MAGNETIC MATERIALS AND TECHNIQUE OF IMPROVING THE DISPERSION PROPERTY OF MAGNETIC POWDER. p. 312: "The condition for high-density recording in a coating-type tape is that it is possible to keep the high output characteristics with respect to a short-wavelength signal at a low noise level. For this purpose, it is necessary that both the coercive force (Hc) and the residual magnetization (Br) are large, and that the thickness of the coating film is thin". It is therefore necessary that the magnetic particles have a high coercive force and they are excellent in dispersibility in the vehicle, and orientation property and packing density in the coating film.

In order to enhance the output of a magnetic recording medium, it is required to have a small switching field distribution (hereinunder referred to as "S.F.D.") and hence, the magnetic particles are required to have a small width of coercive force distribution. This fact is described in Japanese Patent Application Laid-Open (KOKAI) No. 63-26821 (1988): "FIG. 1 is a graph showing the relationship between the S.F.D. of the above-described magnetic disk and the recording and reproducing output. . . . The relationship between the S.F.D. and the recording and reproducing output is linear, as is clear from FIG. 1. It indicates that the recording and reproducing output is enhanced by using ferromagnetic powder having a small S.F.D. That is, in order to obtain a large output, an S.F.D. of not more than 0.6 is necessary.

As well known, the coercive force of magnetic iron oxide particles depend upon the configurational anisotropy, crystalline anisotropy, strain anisotropy, exchange anisotropy, or the interaction thereof.

Acicular magnetite particles and acicular maghemite particles which are used as magnetic iron oxide particles at present show a relatively high coercive force by utilizing the anisotropy derived from their shapes, namely, by increasing the aspect ratio (major axial diameter/minor axial diameter).

The known acicular magnetic particles are obtained by reducing as a starting material goethite particles or hematite particles obtained by heat-treating the goethite particles, in a reducing gas such as hydrogen to form magnetite particles or iron based metal particles or by further oxidizing the thus-obtained magnetite particles in air to form maghemite particles.

The known acicular magnetic iron oxide particles modified with Co or Co and $Fe^{2+}$ are obtained by dispersing acicular magnetite particles or acicular maghemite particles as the precursor particles in an alkaline suspension containing cobalt hydroxide or an alkaline suspension containing cobalt hydroxide and ferrous hydroxide so that 0.1 to 21.0 atomic % of Co based on Fe of the precursor particles is contained, and heat-treating the resultant dispersion.

The residual magnetization (Br) in a magnetic recording medium depends upon the dispersibility of the magnetic particles in the vehicle, and the orientation property and packing density of the magnetic particles in the coated film, and in order to improve these properties, the magnetic particles to be dispersed in the vehicle are required to have as large an aspect ratio (major axial diameter/minor axial diameter) as possible, a uniform particle size distribution and no inclusion of dendrites.

As described above, magnetic iron oxide particles which have a substantially uniform particle size distribution, which are substantially free of dendtritess and which have a large aspect ratio (major axial diameter/minor axial diameter), are now in the strongest demand. In order to obtain magnetic iron oxide particles provided with these properties, it is necessary that as a starting material goethite particles have a substantially uniform particle size distribution, are substantially free of dendrites and have a large aspect ratio (major axial diameter/minor axial diameter).

Various attempts have been made to produce acicular goethite particles which have a uniform particle size distribution and are substantially free of dendrites. For example, Japanese Patent Application Laid-Open (KOKAI) No. 2-293330 (1990) discloses a method of producing acicular goethite particles by adding ascorbic acid or a salt thereof to the suspension containing ferrous hydroxide which is obtained by reacting an aqueous ferrous salt solution with not less than 1.0 equivalent of an aqueous alkali hydroxide and blowing an oxygen-containing gas into the suspension.

Magnetic iron oxide particles which have a uniform particle size distribution, are substantially free of dendtritess, and have a large aspect ratio (major axial diameter/minor axial diameter) and an excellent coercive force distribution are now in the strongest demand. The particles obtained by the method described in Japanese Patent Application Laid-Open (KOKAI) No. 2-293330 (1990) have an aspect ratio (major axial diameter/minor axial diameter) of at the most 10 to 11 and cannot be said to have a large aspect ratio (major axial diameter/minor axial diameter). The method includes the step of adding an alkaline earth metal in addition to an ascorbic acid or a salt thereof. But in this case, the aspect ratio (major axial diameter/minor axial diameter) is at the most 15. The acicular magnetic iron oxide particles produced from as a starting material these goethite particles have a uniform particle size distribution and are substantially free of dendrites, but the aspect ratio (major axial diameter/minor axial diameter) thereof is reduced to ½ to ⅓ after they are subjected to heat treatment.

Accordingly, it is an object of the present invention to provide acicular goethite particles which have a uniform particle size distribution, are substantially free of dendrites and have a large aspect ratio (major axial diameter/minor axial diameter) and acicular magnetic iron oxide particles further having excellent coercive force distribution in addition to the above-described properties.

As a result of studies undertaken by the present inventors, it has been found that by blowing an oxygen-containing gas into a ferrous salt reaction solution containing colloidal ferrous hydroxide or iron-containing colloidal precipitates which is obtained by reacting an aqueous ferrous salt solution with less than one equivalent of an aqueous alkali hydroxide solution, an aqueous alkali carbonate solution or an aqueous alkali hydroxide and alkali carbonate solution based on $Fe^{2+}$ in the aqueous ferrous salt solution so as to oxidize the colloidal ferrous hydroxide or iron-containing colloidal precipitates and to produce acicular goethite particles through green rust, ascorbic acid or a salt thereof and, if necessary, a zinc compound being added to any of the solutions before the production of the acicular goethite particles, or by blowing an oxygen-containing gas into a ferrous salt reaction solution containing colloidal ferrous hydroxide or iron-containing colloidal precipitates which is obtained by reacting an aqueous ferrous salt solution with less than one equivalent of an aqueous alkali hydroxide solution, an aqueous alkali carbonate solution or an aqueous alkali hydroxide and alkali carbonate solution based on $Fe^{2+}$ in the aqueous ferrous salt solution so as to oxidize the colloidal ferrous hydroxide or iron-containing colloidal precipitates and to produce acicular goethite nucleus particles through green rust, ascorbic acid or a salt thereof and, if necessary, a zinc compound being added to any of the solutions before the production of the acicular goethite nucleus particles; and growing the acicular goethite nucleus particles so as to produce acicular goethite particles, the thus-obtained acicular goethite particles and acicular magnetic iron oxide particles have a uniform particle size distribution, are substantially free of dendrites, and have a large aspect ratio (major axial diameter/minor axial diameter) and excellent coercive force distribution. On the basis of this finding, the present invention has been achieved.

SUMMARY OF THE INVENTION

In a first aspect of the present invention, there is provided a process for producing acicular goethite particles comprising the step of: blowing an oxygen-containing gas into a ferrous salt reaction solution containing colloidal ferrous hydroxide or iron-containing colloidal precipitates which is obtained by reacting an aqueous ferrous salt solution with less than one equivalent of an aqueous alkali hydroxide solution, an aqueous alkali carbonate solution or an aqueous alkali hydroxide and alkali carbonate solution based on $Fe^{2+}$ in said aqueous ferrous salt solution, in the presence of ascorbic acid or a salt thereof and if necessary, a zinc compound so as to oxidize said colloidal ferrous hydroxide or iron-containing colloidal precipitates and to produce acicular goethite particles through green rust.

In a second aspect of the present invention, there is provided a process for producing acicular goethite particles comprising the steps of: blowing an oxygen-containing gas into a ferrous salt reaction solution containing colloidal ferrous hydroxide or iron-containing colloidal precipitates which is obtained by reacting an aqueous ferrous salt solution with less than one equivalent of an aqueous alkali hydroxide solution, an aqueous alkali carbonate solution or an aqueous alkali hydroxide and alkali carbonate solution based on $Fe^{2+}$ in the aqueous ferrous salt solution, in the presence of ascorbic acid or a salt thereof and if necessary, a zinc compound so as to oxidize the colloidal ferrous hydroxide or iron-containing colloidal precipitates and to produce acicular goethite nucleus particles through green rust; and growing the acicular goethite nucleus particles so as to produce acicular goethite particles.

In a third aspect of the present invention, there is provided a process for producing acicular magnetic iron oxide particles comprising the steps of: blowing an oxygen-containing gas into a ferrous salt reaction solution containing colloidal ferrous hydroxide or iron-containing colloidal precipitates which is obtained by reacting an aqueous ferrous salt solution with less than one equivalent of an aqueous alkali hydroxide solution, an aqueous alkali carbonate solution or an aqueous alkali hydroxide and alkali carbonate solution based on $Fe^{2+}$ in the aqueous ferrous salt solution, in the presence of ascorbic acid or a salt thereof and if necessary, a zinc compound so as to oxidize the colloidal ferrous hydroxide or iron-containing colloidal precipitates and to produce acicular goethite particles through green rust; or if necessary, using the acicular goethite particles produced through green rust as acicular goethite nucleus particles and growing the produced acicular goethite nucleus particles so as to produce acicular goethite particles; heat-treating in a reducing gas the acicular goethite particles or acicular hematite particles obtained by heat-treating the acicular goethite particles at 300° to 700° C., thereby obtaining acicular magnetite particles; and if necessary, oxidizing the acicular magnetite particles, thereby obtaining acicular maghemite particles.

In a fourth aspect of the present invention, there is provided a process for producing acicular magnetic iron oxide particles comprising the steps of: blowing an oxygen-containing gas into a ferrous salt reaction solution containing colloidal ferrous hydroxide or iron-containing colloidal precipitates which is obtained by reacting an aqueous ferrous salt solution with less than one equivalent of an aqueous alkali hydroxide solution, an aqueous alkali carbonate solution, or an aqueous alkali hydroxide and alkali carbonate solution based on $Fe^{2+}$ in the aqueous ferrous salt solution, in the presence of ascorbic acid or a salt thereof and if necessary, a zinc compound so as to oxidize the colloidal ferrous hydroxide or iron-containing colloidal precipitates and to produce acicular goethite particles through green rust; or if necessary using the acicular goethite particles produced through green rust as the acicular goethite nucleus particles and growing the produced acicular goethite nucleus particles so as to produce acicular goethite particles; heat-treating in a reducing gas the acicular goethite particles or acicular hematite particles obtained by heat-treating the acicular goethite particles at 300° to 700° C., thereby obtaining acicular magnetite particles; oxidizing if necessary, the acicular magnetite particles, thereby obtaining acicular maghemite particles; dispersing the acicular magnetite particles or the acicular maghemite particles as precursor particles in an alkaline suspension containing cobalt hydroxide or cobalt hydroxide and ferrous hydroxide so that the Co content in the suspension is 0.1 to 21.0 atomic % based on Fe of the precursor particles; and heat-treating the resultant aqueous dispersion, thereby obtaining acicular magnetite particles or acicular maghemite particle modified (coated) with Co or Co and $Fe^{2+}$.

DETAILED DESCRIPTION OF THE INVENTION

Figure 1:
FIG. 1 is an electron micrograph (×30000) of the particle structure of the acicular goethite nucleus particles obtained in Example 1.

As an aqueous ferrous salt solution used in the present invention, an aqueous ferrous sulfate solution and an aqueous ferrous chloride solution may be used.

As an aqueous alkali hydroxide solution used for producing acicular goethite nucleus particles in the present invention, an aqueous sodium hydroxide solution and an aqueous potassium hydroxide solution are usable. As an aqueous alkali carbonate solution, an aqueous sodium carbonate solution, an aqueous potassium carbonate solution and an aqueous ammonium carbonate solution are usable.

The amount of aqueous alkali hydroxide solution or aqueous alkali carbonate solution used in the present invention is less than one equivalent based on $Fe^{2+}$ in the aqueous ferrous salt solution. If it is not less than one equivalent, it is very difficult to obtain goethite particles having a large aspect ratio (major axial diameter/minor axial diameter).

The amount of existent acicular goethite nucleus particles in the present invention is not less than 10 mol % based on the total amount of goethite particles produced. If it is less than 10 mol %, it is difficult to arise the growing reaction of the acicular goethite nucleus while maintaining the form thereof, so that it is very difficult to obtain the objective acicular goethite particles.

Ascorbic acid or a salt thereof in the present invention influences the form such as the particle size, the presence or absence of dendrites and an aspect ratio (major axial diameter/minor axial diameter) of the acicular goethite particles produced. It is therefore necessary that ascorbic acid or a salt thereof is existent in a solution before the acicular goethite particles are produced. Ascorbic acid or a salt thereof may be added to any of the aqueous ferrous salt solution, aqueous alkali hydroxide solution, aqueous alkali carbonate solution, ferrous salt reaction solution containing colloidal ferrous hydroxide or iron-containing colloidal precipitates, and the reaction solution which is producing green rust.

As a salt of ascorbic acid, sodium ascorbate, etc. is usable.

The amount of ascorbic acid or a salt thereof added is 0.01 to 5.0 mol % calculated as ascorbic acid based on Fe in the ferrous salt reaction solution containing colloidal ferrous hydroxide or iron-containing colloidal precipitates. If it is less than one 0.01 mol %, the objective goethite particles which have a uniform particle size distribution, no inclusion of dendrites and a large aspect ratio (major axial diameter/minor axial diameter), cannot be obtained. If it exceeds 5.0 mol %, the major axial diameter of acicular goethite particles produced is small and, hence, the aspect ratio (major axial diameter/minor axial diameter) is also small, so that it is impossible to obtain the objective acicular goethite particles.

A zinc compound is also preferably existent in a solution like ascorbic acid or a salt thereof before the acicular goethite particles or the acicular goethite nucleus particles are produced. A zinc compound may be added to any of the aqueous ferrous salt solution, aqueous alkali hydroxide solution or aqueous alkali carbonate solution, ferrous salt reaction solution containing colloidal ferrous hydroxide or iron-containing colloidal precipitates, and the reaction solution which is producing green rust. The order in which ascorbic acid or a salt thereof and a zinc compound are added to a solution is not restricted, and they may also be added simultaneously, As the zinc compound, zinc sulfate, zinc chloride, zinc nitrate, etc. are usable. The amount of zinc compound added is 0.1 to 7.0 mol % based on Fe in the ferrous salt reaction solution containing colloidal ferrous hydroxide or iron-containing colloidal precipitates. If it is less than 0.1 mol %, the effect of the zinc compound on the increase in the aspect ratio (major axial diameter/minor axial diameter) of the acicular goethite particles is insufficient. Even if it exceeds 7.0 mol %, it is possible to obtain acicular goethite particles, but addition of any more than is necessary is meaningless.

In the present invention, elements such as P, Al and Si, which are generally added in the process for producing goethite particles in order to improve various properties of magnetic particles may be added. In this case, it is also possible to produce the objective acicular goethite particles.

In order to grow the acicular goethite nucleus particles in the present invention, any method may be selected from the group consisting of a method ① of blowing an oxygen-containing gas into the ferrous salt reaction solution containing the acicular goethite nucleus particles while maintaining the pH at 3 to 6 after, if necessary, adding a ferrous salt thereto; a method ② of blowing an oxygen-containing gas into the ferrous salt reaction solution containing the acicular goethite nucleus particles at a pH of 8 to 10 which is adjusted by adding an aqueous alkali carbonate solution or an aqueous alkali carbonate and alkali hydroxide solution thereto after, if necessary, adding a ferrous salt thereto; and a method ③ of blowing an oxygen-containing gas into the ferrous salt reaction solution containing the acicular goethite nucleus particles at a pH of not less than 11 which is adjusted by adding an aqueous alkali hydroxide solution thereto after, if necessary, adding a ferrous salt thereto.

The acicular goethite particles obtained by growing the acicular goethite nucleus particles at a pH of 8 to 10 have a more uniform particle size distribution, no inclusion of dendrites and a larger aspect ratio (major axial diameter/minor axial diameter).

In the present invention, an oxidization is carried out by blowing an oxygen-containing gas such as air into a solution under mechanical stirring, if necessary.

The oxidizing reaction temperature in the present invention is not higher than 80° C., preferably 30° to 55° C. when producing the acicular goethite nucleus particles and growing the acicular goethite nucleus particles by the methods ② and ③ and not higher than 90° C., preferably 30° to 90° C. when growing the acicular goethite nucleus particles by the method ①. If the temperature is higher than the said temperatures, glanular magnetite particles are included in the acicular goethite particles.

The same reaction vessel may be used both for the reaction for producing goethite nucleus particles and for the reaction for growing the goethite nucleus particles. It is also possible to obtain the objective goethite particles by using different reaction vessels for these reactions.

It is possible, if necessary, to coat the starting material particles with elements such as P, Al and Si, which have a sintering preventing effect, prior to the heat treatment in a reducing gas. The coating treatment prevents sintering particles and between particles, maintains the shape and the aspect ratio (major axial diameter/minor axial diameter) of the starting material particles and facilitates the production of discrete magnetic iron oxide particles.

The oxidization in air according to the present invention is carried out at 200° to 500° C. by an ordinary method.

A Co-modification(Co-coating) of the magnetic iron oxide particles in the present invention can be carried out by an ordinary method. For example, the Co-modification is carried out by dispersing the precursor particles in an alkaline suspension containing cobalt hydroxide or cobalt hydroxide and ferrous hydroxide, and heat-treating the dispersion, as described in, e.g., Japanese Patent Publication Nos. 52-24237 (1977), 52-24238 (1977), 52-36751 (1977) and 52-36863 (1977).

The cobalt hydroxide in the present invention is obtained by using an water-soluble cobalt salt such as cobalt sulfide and cobalt chloride, and an aqueous alkali hydroxide solution such as an aqueous sodium hydroxide solution and an aqueous potassium hydroxide solution.

The ferrous hydroxide in the present invention is obtained by using a water-soluble ferrous salt such as ferrous sulfide and ferrous chloride, and an aqueous alkali hydroxide solution such as an aqueous sodium hydroxide solution and an aqueous potassium hydroxide solution.

The heat treatment for Co-modification is preferably carried out in an non-oxidizing atmosphere at a temperature of 50° to 100° C.

The temperature for Co-modification in the present invention concerns the treating time. If the temperature is lower than 50° C., the magnetite particles or maghemite particles modified with Co or Co and $Fe^{2+}$ are difficult to produce, and even if they are produced, the treating for a very long time is required.

The amount of the water-soluble cobalt salt used for Co-modification in the present invention is 0.1 to 21.0 atomic % calculated as Co based on Fe in the precursor particles. If it is less than 0.1 atomic %, the coercive force of the acicular magnetite or maghemite particles produced is improved sufficiently. On the other hand, if it is more than 21.0 atomic %, the coercive force distribution of the acicular magnetite or maghemite particles produced is not sufficient.

The amount of the water-soluble ferrous salt used for Fe-modification in the present invention is 0 to 35 atomic % calculated as $Fe^{2+}$ based on Fe in the precursor particles.

Almost the whole amount of water-soluble Co salt and water-soluble ferrous salt added is utilized for the modification of the surfaces of the magnetic iron oxide particles.

In consideration of the coercive force and the coercive force distribution of the acicular magnetite particles or maghemite particles, the amount of water-soluble Co salt added is preferably 2.0 to 18.0 atomic %.

According to the present invention, when an oxygen-containing gas is blown into a ferrous salt reaction solution containing colloidal ferrous hydroxide or iron-containing colloidal precipitates which is obtained by reacting an aqueous ferrous salt solution with less than one equivalent of an aqueous alkali hydroxide solution, an aqueous alkali carbonate solution, or an aqueous alkali hydroxide and alkali carbonate solution based on $Fe^{2+}$ in the aqueous ferrous salt solution so as to oxidize the ferrous hydroxide or colloidal iron-containing colloidal precipitates and to produce acicular goethite particles through green rust, while adding ascorbic acid or a salt thereof and, if necessary, a zinc compound to any of the solutions before the acicular goethite particles are produced; or when an oxygen-containing gas is blown into a ferrous salt reaction solution containing colloidal ferrous hydroxide or iron-containing colloidal precipitates which is obtained by reacting an aqueous ferrous salt solution with less than one equivalent of an aqueous alkali hydroxide solution, an aqueous alkali carbonate solution, or an aqueous alkali hydroxide and alkali carbonate solution based on $Fe^{2+}$ in the aqueous ferrous salt solution so as to oxidize the colloidal ferrous hydroxide or iron-containing colloidal precipitates and to produce acicular goethite particles through green rust, the acicular goethite particles produced through green rust are used as the acicular goethite nucleus particles, and the acicular goethite nucleus particles are grown so as to produce acicular goethite particles, while adding ascorbic acid or a salt thereof and, if necessary, a zinc compound to any of the solutions before the acicular goethite nucleus particles are produced, it is possible to obtain acicular goethite particles which have a uniform particle size distribution, which are substantially free of dendrites and which have a large aspect ratio (major axial diameter). The acicular magnetic iron oxide particles obtained from the acicular goethite particles as a starting material also have a uniform particle size distribution, are free of dendrites and have a large aspect ratio (major axial diameter/minor axial diameter). The acicular magnetic iron oxide particles having these properties are also excellent in the coercive force distribution.

It is considered to be because ascorbic acid or a salt thereof is existent in a solution which is producing green rust, that acicular goethite particles which have a uniform particle size distribution, which are substantially free of dendrites and which have a large aspect ratio (major axial diameter/minor axial diameter) are obtained, as is obvious from later-described Comparative Examples in which the objective acicular goethite particles are not obtained in the case where ascorbic acid or a salt thereof is not existent in a solution which is producing green rust before the acicular goethite particles or the acicular goethite nucleus particles are produced, or in the case where the acicular goethite particles are produced not through green rust in spite of the existence of ascorbic acid or a salt thereof. The influence of the ascorbic acid or a salt thereof on the crystal habit forming process of the goethite particles is different between the reaction for producing goethite particles at a pH of not less than 11 not through green rust, in which the ascorbic acid or a salt thereof acts on the colloidal aqueous hydroxide which is produced by reacting the aqueous ferrous salt solution with the aqueous alkali hydroxide, and the reaction according to the present invention in which the ascorbic acid or a salt thereof acts on the green rust at a pH of 5 of 7.

As the amount of ascorbic acid or a salt thereof added is increased, the aspect ratio (major axial diameter/minor axial diameter) of the acicular goethite particles has a tendency of increasing.

If a zinc compound is used together with an ascorbic acid or a salt thereof, it is possible to obtain acicular goethite particles having a more uniform particle size distribution, no inclusion of dendrites and a larger aspect ratio (major axial diameter/minor axial diameter) due to the synergistic effect.

By adding ascorbic acid or a salt thereof, acicular goethite particles having an aspect ratio (major axial diameter/minor axial diameter) of not less than 20 are obtained, while by adding a zinc compound together with an ascorbic acid or a salt thereof, acicular goethite particles having an aspect ratio (major axial diameter/minor axial diameter) of not less than 20, especially, not less than 25 are obtained.

The thus-obtained acicular goethite particles according to the present invention have a major axial diameter of 0.1 to 0.6 μm, preferably 0.12 to 0.4 μm, an aspect ratio (major axial diameter/minor axial diameter) of not less than 20, preferably 25 to 40, and a particle size distribution (geometric standard deviation) of not less than 0.55, preferably not less than 0.6, more preferably not less than 0.7.

The acicular magnetite particles according to the present invention have a major axial diameter of 0.05 to 0.5 μm, preferably 0.05 to 0.4 μm, an aspect ratio (major axial diameter/minor axial diameter) of not less than 6.0, preferably 7.0 to 10.0 and a particle size distribution (geometrical standard deviation ($\sigma_g$)) of not less than 0.5, preferably not less than 0.55.

The acicular maghemite particles according to the present invention have a major axial diameter of 0.05 to 0.5 μm, preferably 0.05 to 0.4 μm, an aspect ratio (major axial diameter/minor axial diameter) of not less than 6.0, preferably 7.0 to 10.0 and a particle size distribution (geometrical standard deviation ($\sigma_g$)) of not less than 0.45, preferably not less than 0.5.

The acicular magnetite particles modified with Co or Co and $Fe^{2+}$ according to the present invention have a major axial diameter of 0.05 to 0.5 μm, preferably 0.05 to 0.4 μm, an aspect ratio (major axial diameter/minor axial diameter) of not less than 5.5, preferably 5.7 to 9.0, a particle size distribution (geometrical standard deviation ($\sigma_g$)) of not less than 0.45, preferably not less than 0.50 and contain 0.1 to 21 atomic % of Co based on Fe of the precursor particles and 0 to 25 wt % of coated $Fe^{2+}$ based on Fe in the precursor particles.

The acicular maghemite particles modified with Co or Co and $Fe^{2+}$ according to the present invention have a major axial diameter of 0.05 to 0.5 μm, preferably 0.05 to 0.4 μm, an aspect ratio (major axial diameter/minor axial diameter) of not less than 5.5, preferably 5.7 to 9.0 and a particle size distribution (geometrical standard deviation ($\sigma_g$)) of not less than 0.4, preferably not less than 0.5, and contains 0.1 to 21 atomic % of Co based on Fe of the precursor particles and 0 to 25 atomic % of coated $Fe^{2+}$ based on Fe in the precursor particles.

According to the process for producing acicular goethite particles, it is possible to obtain acicular goethite particles which have a uniform particle size distribution, which are free of dendrites and which have a large aspect ratio (major axial diameter/minor axial diameter).

According to the process for producing the magnetic iron oxide particles according to the present invention, it is possible to obtain acicular magnetic iron oxide particles which have a uniform particle size distribution, which are free of dendrites and which have a large aspect ratio (major axial diameter/minor axial diameter) and excellent coercive force distribution, so that they are suitable as magnetic particles for high-density, high-sensitivity and high-output recording.

[EXAMPLES]

The present invention will be explained in more detail while referring to the following non-limitative examples.

The major axial diameter and the aspect ratio (major axial diameter/minor axial diameter) in each of the following examples and comparative examples are expressed by the average values of the values obtained by measuring them in the electron micrographs.

The particle size distribution is expressed by the geometrical standard deviation ($\sigma_g$). The major axial diameters of 350 particles were measured from electron micrographs (×120,000) and the actual major axial diameters were calculated from the measured values. A cumulative amount (%) obtained from the number of the particles belonging to each regular interval of the particle diameter was plotted in a logarithmicro-normal probability paper with particle diameter (μm) as abscissa and cumulative amount (%) as ordinate in accordance with a statistical method from the actual particle diameter and the number of the particles. A particle diameter ($D_{50}$) when the cumulative amount is 50% and a particle diameter ($D_{84.13}$) when the cumulative amount is 84.13%, were read out of the obtained lognormal distribution graph. The geometric standard deviation ($\sigma_g$) was found by dividing the particle diameter ($D_{50}$) by the particle diameter ($D_{84.13}$) [$\sigma_g = D_{50}/D_{84.13}$].

The magnetic characteristics and the coating film properties of the magnetic iron oxide particles were measured by using an "sample vibrating type magnetometer VSM-3S-15", (produced by Toei Kogyo K.K.) and applying an external magnetic field up to 5 KOe in case of acicular magnetite particles and acicular maghemite particles, or an external magnetic field up to 10 KOe in case of acicular magnetic iron oxide particles modified with Co or Co and $Fe^{2+}$.

A sheet-like sample obtained by a method shown in later-described Example 52 was used for measuring the squareness and the S.F.D. of the coating film. The S.F.D. was measured by using a differentiation circuit of the above-described magnetometer to obtain the differentiation curve of the demagnetizing curve of the magnetism hysteresis curve, measuring the half-width value of the curve and dividing the half-width by the coercive force.

<Production of Acicular Goethite Particles>

EXAMPLES 1 TO 7

Comparative EXAMPLES 1 TO 3

Example 1

464 l of an aqueous ferrous sulfide solution containing 1.50 mol/l of $Fe^{2+}$ and 228 l of 2.7-N aqueous NaOH solution (the content of NaOH corresponds to 0.42 equivalent based on $Fe^{2+}$ in the aqueous ferrous sulfide solution) were mixed to produce at 40° C. at pH 6.8 an aqueous ferrous sulfide solution containing $Fe(OH)_2$.

To the aqueous ferrous sulfide solution containing $Fe(OH)_2$, 0.1 l of an aqueous solution containing 23.8 g of ascorbic acid (corresponding to 0.35 mol % based on Fe) was added, and an air was then blown thereinto at a rate of 800 l per minute at 40° C. for 6.8 hours, thereby producing goethite nucleus particles. A part of the reaction solution was extracted, filtered out, washed with water and dried by an ordinary method. The electron micrograph ($\times 30000$) of the particles obtained is shown in FIG. 1.

The acicular goethite particles produced had a major axial diameter of 0.214 μm and an aspect ratio (major axial diameter/minor axial diameter) of 28, as shown in the FIG. 1. The particle size distribution was uniform as expressed by a geometric standard deviation ($\sigma_g$) of 0.829, and no dendrites were included therein.

The goethite particles were used as acicular goethite nucleus particles, and 208 l of 7.0-N aqueous $Na_2CO_3$ solution (the content of $Na_2CO_3$ corresponds to 1.8 equivalents based on $Fe^{2+}$ in the residual aqueous ferrous sulfide solution) was added to the aqueous ferrous sulfide solution containing the acicular goethite nucleus particles (the amount of existent goethite nucleus particles corresponds to 42 mol % of the amount of goethite particles produced). Air was blown into the resultant solution at a rate of 800 l per minute at 50° C. at pH 8.9 for 2.0 hours, thereby producing goethite particles. The goethite particles produced were filtered out, washed with water and dried by an ordinary method.

Figure 2:
FIG. 2 is an electron micrograph (×30000) of the particle structure of the acicular goethite particles obtained in Example 1.

The goethite particles produced were acicular particles having a major axial diameter of 0.267 μm and an aspect ratio (major axial diameter/minor axial diameter) of 28, as shown in the electron micrograph ($\times 30000$) in FIG. 2. The particle size distribution was uniform as expressed by a geometric standard deviation ($\sigma_g$) of 0.817, and no dendrites were included therein.

Examples 2 to 7

Comparative Examples 1 to 3

Acicular goethite particles were produced in the same way as in Example 1 except for varying the kind and amount of aqueous ferrous salt solution used, the kind, concentration and amount of aqueous alkaline solution, the kind and amount of ascorbic acid or a salt thereof used, the time for adding the ascorbic acid or a salt-thereof, the kind and amount of additional element and the reaction temperature in the process for producing acicular goethite particles or acicular goethite nucleus particles; and the amount of existent goethite nucleus particles, the kind, concentration and amount of aqueous alkaline solution, the kind and amount of additional element and the reaction temperature in the process for growing the goethite nuclear particles.

The main conditions for production and the properties of the goethite particles obtained are shown in Tables 1 and 2. In Comparative Examples 2 and 3, acicular goethite nucleus particles were not produced through green rust but acicular goethite particles were directly produced by blowing an oxygen-containing gas at a pH of not less than 11.

Figure 3:
FIG. 3 is an electron micrograph (×30000) of the particle structure of the acicular goethite nucleus particles obtained in Example 3.
Figure 4:
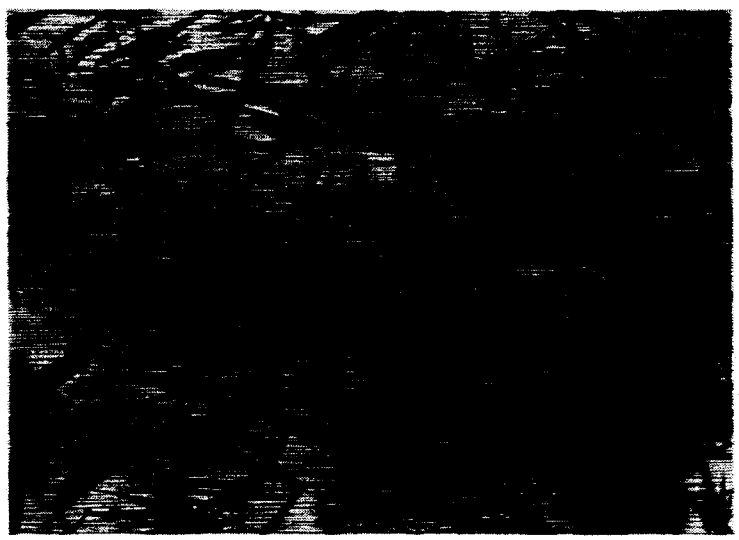
FIG. 4 is an electron micrograph (×30000) of the particle structure of the acicular goethite particles obtained in Example 3.
Figure 5:
FIG. 5 is an electron micrograph (×30000) of the particle structure of the acicular goethite nucleus particles obtained in Comparative Example 1.
Figure 6:
FIG. 6 is an electron micrograph (×30000) of the particle structure of the acicular goethite particles obtained in Comparative Example 1.
Figure 7:
FIG. 7 is an electron micrograph (×30000) of the particle structure of the acicular goethite particles obtained in Comparative Example 2.
Figure 8:
FIG. 8 is an electron micrograph (×30000) of the particle structure of the acicular goethite particles obtained in Comparative Example 3.

FIGS. 3 and 4 are electron micrographs ($\times 30000$) of the acicular goethite nucleus particles and the acicular goethite particles, respectively, obtained in Example 3, FIGS. 5 and 6 are electron micrographs ($\times 30000$) of the acicular goethite nucleus particles and the acicular goethite particles, respectively, obtained in Comparative Example 1, and FIGS. 7 and 8 are electron micrographs ($\times 30000$) of the acicular goethite particles obtained in Comparative Examples 2 and 3, respectively.

As a result of observation through an electron microscope, it was proved that any of the acicular goethite particles obtained in Examples 2 and 4 to 7 had a uniform particle size distribution, no inclusion of dendrites and a large aspect ratio (major axial diameter/minor axial diameter).

The particle size distributions of the acicular goethite particles obtained in Comparative Examples 1 and 3 were non-uniform and dendrites were included therein, as shown in the electron micrographs in FIGS. 6 and 8. The aspect ratio (major axial diameter/minor axial diameter) of the acicular goethite particles obtained in Comparative Example 2 was small.

<Production of Acicular Magnetite Particles>

Examples 8 to 16

Comparative Examples 4 to 6

Example 8

16.7 Kg of the paste of the acicular goethite particles (corresponding to about 5.0 Kg of acicular goethite particles) obtained in Example 1 and filtered out and washed with water was suspended in 88 l of water. The pH of the suspension was 7.5. Thereafter, 750 ml of an aqueous solution containing 75 g of sodium hexametaphosphate (corresponding to 1.15 wt % calculated as PO₃ based on the acicular goethite particles) was added to the suspension, and the mixture was stirred for 30 minutes. The resultant suspension was filtered and dried to obtain acicular goethite particles with the surfaces coated with a P compound. The thus-obtained acicular goethite particles coated with a P compound were heat-treated in air at 320° C., thereby obtaining acicular hematite particles coated with a P compound.

1000 g of the thus-obtained acicular hematite particles coated with a P compound were charged into a retort reducing vessel, and $H_2$ gas was blown into the particles at a rate of 2 l per minute while rotating the vessel to reduce them at 360° C., thereby obtaining acicular magnetite particles coated with a P compound.

It was observed through an electron microscope that the acicular magnetite particles coated with a P compound had an average major axial diameter of 0.18 μm, an aspect ratio (major axial diameter/minor axial diameter) of 7.9, that the particle size distribution was uniform as expressed by a geometric standard deviation ($\sigma_g$) of 0.66 and that no dendrites were included. When the magnetic characteristics were measured, the coercive force (Hc) was 387 Oe and the saturation magnetization ($\sigma_s$) was 83.8 emu/g.

Examples 9 to 16,

Comparative Examples 4 to 6

Acicular magnetite particles were obtained in the same way as in Example 8 except for varying the kind of the starting material, the execution or omission of the P-compound coating step, the execution or omission of the heat treatment in air and the heat-treating temperature.

The main conditions for production and the properties of the acicular magnetite particles obtained are shown in Table 3. As a result of observation through an electron microscope, any of the acicular magnetite particles obtained in Examples 9 to 16 proved to have a uniform particle size distribution and no inclusion of dendrites.

<Production of Acicular Maghemite Particles>

Examples 17 to 25

Comparative Examples 7 to 9

Example 17

300 g of the acicular magnetite particles coated with a P compound obtained in Example 8 were oxidized in air at 300° C. for 60 minutes to obtain acicular maghemite particles with the surfaces coated with a P compound.

It was observed through an electron microscope that the acicular maghemite particles coated with a P compound had an average major axial diameter of 0.17 μm, an aspect ratio (major axial diameter/minor axial diameter) of 7.8, the particle size distribution was uniform as expressed by a geometric standard deviation ($\sigma_g$) of 0.65 and no dendrites were included. When the magnetic characteristics were measured, the coercive force (Hc) was 354 Oe and the saturation magnetization ($\sigma_s$) was 73.6 emu/g.

Examples 18 to 25,

Comparative Examples 7 to 9

Acicular maghemite particles were obtained in the same way as in Example 17 except for varying the kind of acicular magnetite particles. The main conditions for production and the properties of the maghemite particles obtained are shown in Table 4. As a result of observation through an electron microscope, any of the acicular maghemite particles obtained in Examples 18 to 25 proved to have a uniform particle size distribution and no inclusion of dendrites.

<Production of Acicular Co-Modified Magnetite Particles>

Examples 26 to 38

Comparative Examples 10 to 12

Example 26

100 g of the acicular magnetite particles with the surfaces coated with a P compound obtained in Example 14 were charged into 1.0 l of water with 0.085 mol of cobalt and 0.179 mol of ferrous dissolved therein by using cobalt sulfate and ferrous sulfate while preventing the inclusion of air as much as possible, and dispersed until the dispersion became a fine slurry. Into the dispersion, 102 ml of 18-N aqueous NaOH solution was poured and water was further added so as to form 1.3 l of a dispersion in which the hydroxyl concentration was 1.0 mol/l. The temperature of the dispersion was raised to 100° C. and it was stirred for 5 hours. Thereafter, the slurry was taken out, washed with water, filtered out and dried at 60° C. to obtain acicular Co-modified magnetite particles.

As a result of observation through an electron microscope, it was proved that the acicular magnetite particles modified with Co and $Fe^{2+}$ obtained had the same shape and the particle size as the precursor particles, namely, the acicular magnetite particles with the surfaces coated with a P compound, an average major axial diameter of 0.28 μm and an aspect ratio (major axial diameter/minor axial diameter) of 7.1. The particle size distribution was uniform as expressed by a geometric standard deviation ($\sigma_g$) of 0.56. When the magnetic characteristics were measured, the coercive force (Hc) was 803 Oe and the saturation magnetization ($\sigma_s$) was 83.1 emu/g.

Examples 27 to 38,

Comparative Examples 10 to 12

Acicular magnetite particles modified by Co or Co and $Fe^{2+}$ were obtained in the same way as in Example 26 except for varying the kind of precursor particles, the amounts of Co added, $Fe^{2+}$ added and NaOH added under conditions that the amount of precursor magnetite particles was 100 g and the whole volume of the dispersion was 1.3 l.

The main conditions for production and the properties of the particles obtained are shown in Table 5.

<Production of Acicular Co-Modified Maghemite Particles>

Examples 39 to 51

Comparative Examples 13 to 15

Example 39

100 g of acicular maghemite particles with the surfaces coated with a P compound obtained in Example 23 were charged into 1.0 l of water with 0.085 mol of cobalt and 0.179 mol of ferrous dissolved therein by using cobalt sulfate and ferrous sulfate while preventing the inclusion of air as much as possible, and dispersed until the dispersion became a fine slurry. Into the dispersion, 102 ml of 18-N aqueous NaOH solution was poured and water was further added so as to form 1.3 l of dispersion in which the hydroxyl concentration was 1.0 mol/l. The temperature of the dispersion was raised to 100° C. and it was stirred for 5 hours. Thereafter, the slurry was taken out, washed with water, filtered out and dried at 60° C. to obtain acicular Co-modified maghemite particles.

As a result of observation through an electron microscope, it was proved that the acicular maghemite particles modified with Co and $Fe^{2+}$ obtained had the same shape and the particle size as the precursor particles, namely, the acicular maghemite particles with the surfaces coated with a P compound, an average major axial diameter of 0.27 μm and an aspect ratio (major axial diameter/minor axial diameter) of 7.0. The particle size distribution was uniform as expressed by a geometric standard deviation ($\sigma_g$) of 0.56. When the magnetic characteristics were measured, the coercive force (Hc) was 779 Oe and the saturation magnetization ($\sigma_s$) was 76.3 emu/g.

Examples 40 to 51

Comparative Examples 13 to 15

Acicular maghemite particles modified by Co or Co and $Fe^{2+}$ were obtained in the same way as in Example 39 except for varying the kind of the precursor particles, the amounts of Co added, Fe(II) added and NaOH added and the treating temperature and time under conditions that the amount of precursor acicular maghemite particles was 100 g and the whole volume of the dispersion was 1.3 l.

The main conditions for production and the properties of the particles obtained are shown in Table 6.

<Production of Magnetic Tape>

Examples 52 to 95

Comparative Examples 16 to 27

Example 52

A magnetic tape was produced in the following manner. A magnetic coating was prepared by charging the acicular magnetic iron oxide particles with the surfaces coated with a P compound obtained in Example 8, the resin and the solvents described below into a 140-cc glass bottle in the following ratio and mixing and dispersing the above materials by a paint conditioner for 2 hours. The magnetic coating was applied to a polyethylene terephthalate film (25 μm in thickness) to a thickness of 40 μm by an applicator, and the film was then oriented and dried in a magnetic field of 1450 Gauss.

| | |
|---|---|
| Glass beads 1.5 mm in diameter | 100 g |
| Acicular magnetite particles | 15 g |
| Toluene | 5.6 g |
| Phosphate ester (GAFAC RE-610, produced by Toho Chemical Industrial Co., Ltd.) | 0.6 g |
| Lecithin | 0.6 g |
| Vinyl chloride-vinyl acetate copolymer resin (Vinilite VAGH produced by Union Carbide) | 3.75 g |
| Butadiene acrylonitrile rubber (Hycar 1432 J, produced by Japanese Geon Co., Ltd.) | 0.75 g |
| Mixed solution of Methyl isobutyl keton, methyl ethyl ketone and toluene (3:1:1) | 40.5 g |

The magnetic tape produced had and an S.F.D. of 0.50, a coercive force (Hc) of 355 Oe, a residual flux density (Br) of 1660 Gauss and a squareness (Br/Bm) of 0.81.

Examples 53 to 95

Comparative Examples 16 to 27

Magnetic tapes were produced in the same way as in Example 52 except for varying the kind of magnetic particles. The acicular maghemite particles were oriented in a magnetic field of 1450 Gauss and the Co-modified magnetic iron oxide particles were oriented in a magnetic field of 1900 Gauss. The properties of the magnetic tapes obtained are shown in Tables 7 to 10.

TABLE 1

| | Production of goethite nucleus particles | | | | | |
|---|---|---|---|---|---|---|
| | Aqueous ferrous salt solution | | | Aqueous alkaline solution | | |
| | | | | | | Amount |
| Examples and Comparative Examples | Kind | $Fe^{2+}$ concentration (mol/l) | Amount (l) | Kind | Concentration (N) | (l) | $CO_3$/Fe or 2OH/Fe 2OH/Fe (equivalent ratio) |
| Example 1 | FeSO$_4$ | 1.50 | 464 | NaOH | 2.7 | 228 | 0.42 |
| Example 2 | FeSO$_4$ | 1.50 | 464 | NaOH | 2.7 | 228 | 0.42 |
| Example 3 | FeSO$_4$ | 1.50 | 464 | NaOH | 2.7 | 228 | 0.42 |
| Example 4 | FeSO$_4$ | 1.50 | 420 | NaOH | 1.5 | 380 | 0.45 |
| Example 5 | FeCl$_2$ | 1.50 | 373 | K$_2$CO$_3$ | 1.7 | 327 | 0.50 |
| Example 6 | FeSO$_4$ | 1.50 | 377 | NaOH Na$_2$CO$_3$ | 1.4 1.4 | 87 204 | 0.36 |
| Example 7 | FeSO$_4$ | 1.50 | 464 | KOH | 3.0 | 205 | 0.42 |
| Comparative Example 1 | FeSO$_4$ | 1.50 | 464 | NaOH | 2.7 | 228 | 0.42 |
| Comparative Example 2 | FeSO$_4$ | 1.50 | 464 | NaOH | 7.4 | 436 | 2.3 |
| Comparative Example 3 | FeSO$_4$ | 1.50 | 180 | NaOH | 1.8 | 720 | 2.4 |

| | Production of goethite nucleus particles | | | | | | | |
|---|---|---|---|---|---|---|---|---|
| | Ascorbic acid or salt thereof | | | Additional metal | | | | |
| Examples and Comparative Examples | Kind | Amount (mol %) | Time for addition* | Kind | Amount (mol %) | Time for addition* | pH for reaction | Reaction temperature (°C.) | Reaction time (hr) |
| Example 1 | Ascorbic acid | 0.35 | A | — | — | — | 6.8 | 40 | 6.8 |
| Example 2 | Ascorbic acid | 0.30 | D | P | 0.23 | A | 6.8 | 40 | 7.5 |
| Example 3 | Ascorbic | 0.35 | A | Zn | 1.0 | A | 6.8 | 40 | 8.1 |

TABLE 1-continued

|  |  |  |  |  |  |  |  |  |  |
|---|---|---|---|---|---|---|---|---|---|
| Example 4 | Sodium ascorbate | 0.35 | B | — | — | — | 6.8 | 40 | 6.6 |
| Example 5 | Sodium ascorbate | 0.35 | C | Al | 1.0 | — | 6.8 | 40 | 6.4 |
| Example 6 | Ascorbic acid | 0.12 | C | P | 0.24 | B | 6.5 | 40 | 2.7 |
| Example 7 | Ascorbic acid | 0.15 | D | — | — | C | 6.7 | 40 | 3.2 |
| Comparative Example 1 | — | — | — | — | — | — | 6.8 | 40 | 14.7 |
| Comparative Example 2 | Ascorbic acid | 0.35 | A | — | — | — | 13.0 | 40 | 27.6 |
| Comparative Example 3 | — | — | — | — | — | — | 12.8 | 40 | 8.8 |

*A: Add to aqueous ferrous salt solution.
B: Add to aqueous alkali hydroxide or aqueous alkali carbonate.
C: Add to ferrous salt reaction solution containing colloidal ferrous hydroxide, or iron-containing colloidal precipitates.
D: Add to ferrous salt reaction solution containing green rust.

TABLE 2

| Examples and Comparative Examples | Goethite nucleus particles | | | Amount of goethite nucleus particles (mol %) | Growing goethite nucleus particles | | | |
|---|---|---|---|---|---|---|---|---|
| | | | | | Aqueous alkaline solution | | | |
| | Particle size distribution ($\sigma g$) | Major axial diameter ($\mu m$) | Aspect ratio (major axial diameter/minor axial diameter) | | Kind | Concentration (N) | Amount (l) | $CO_3$/Fe or $2OH$/Fe (equivalent ratio) |
| Example 1 | 0.829 | 0.214 | 28 | 42 | $NaCO_3$ | 7.0 | 208 | 1.8 |
| Example 2 | 0.810 | 0.197 | 32 | 42 | $NaCO_3$ | 7.0 | 208 | 1.8 |
| Example 3 | 0.804 | 0.230 | 33 | 42 | $NaCO_3$ | 7.0 | 208 | 1.8 |
| Example 4 | 0.827 | 0.226 | 25 | 45 | NaOH | 13.0 | 53 | 1.0 |
| Example 5 | 0.815 | 0.210 | 27 | 50 | NaOH | 8.1 | 200 | 2.9 |
| Example 6 | 0.818 | 0.263 | 28 | 36 | NaOH | 7.0 | 62 | 2.0 |
| | | | | | $NaCO_3$ | 7.0 | 145 | |
| Example 7 | 0.830 | 0.161 | 25 | 42 | $NaCO_3$ | 7.0 | 231 | 2.0 |
| Comparative Example 1 | 0.486 | 0.413 | 9 | 42 | $NaCO_3$ | 7.0 | 208 | 1.8 |
| Comparative Example 2 | — | — | — | — | — | — | — | — |
| Comparative Example 3 | — | — | — | — | — | — | — | — |

| Examples and Comparative Examples | Growing goethite nucleus particles | | | Goethite particles | | |
|---|---|---|---|---|---|---|
| | pH for reaction | Reaction temperature (°C.) | Reaction time (hr) | Particle size distribution ($\sigma g$) | Major axial diameter ($\mu m$) | Aspect ratio (major axial diameter/minor axial diameter) |
| Example 1 | 8.9 | 50 | 2.0 | 0.817 | 0.267 | 28 |
| Example 2 | 8.9 | 50 | 3.2 | 0.801 | 0.246 | 33 |
| Example 3 | 8.9 | 50 | 4.0 | 0.766 | 0.288 | 35 |
| Example 4 | 4.5 | 80 | 8.7 | 0.742 | 0.330 | 25 |
| Example 5 | 13.1 | 50 | 12.4 | 0.769 | 0.386 | 28 |
| Example 6 | 8.7 | 52 | 3.1 | 0.803 | 0.325 | 27 |
| Example 7 | 8.9 | 50 | 1.5 | 0.821 | 0.201 | 25 |
| Comparative Example 1 | 8.9 | 50 | 12.9 | 0.489 | 0.523 | 10 |
| Comparative Example 2 | — | — | — | 0.518 | 0.350 | 11 |
| Comparative Example 3 | — | — | — | 0.544 | 0.261 | 9 |

TABLE 3

| Examples & Comparative Examples | Acicular goethite particles (Example No. & Comparative Example No.) | Coating with P compound | | Heating temperature in air (°C.) | Reducing temperature (°C.) | Acicular magnetite particles | | | | |
|---|---|---|---|---|---|---|---|---|---|---|
| | | Kind | Amount (wt %) | | | Major axial diameter ($\mu m$) | Aspect ratio (major axial diameter/minor axial diameter) | Particle size distribution ($\sigma g$) | Coercive force Hc (Oe) | Saturation magnetization $\sigma_s$ (emu/g) |
| Example 8 | Example 1 | Sodium hexametaphosphate | 1.15 | 320 | 360 | 0.18 | 7.9 | 0.66 | 387 | 83.8 |

TABLE 3-continued

| Example 9 | Example 2 | Sodium hexametaphosphate | 1.15 | 320 | 360 | 0.17 | 8.2 | 0.65 | 393 | 80.1 |
| Example 10 | Example 3 | Sodium hexametaphosphate | 1.15 | 320 | 360 | 0.19 | 8.7 | 0.60 | 398 | 83.3 |
| Example 11 | Example 4 | — | — | 320 | 360 | 0.26 | 7.0 | 0.58 | 403 | 84.7 |
| Example 12 | goethite nucleus particles of Example 4 | Sodium hexametaphosphate | 1.15 | 320 | 360 | 0.15 | 7.4 | 0.57 | 382 | 83.0 |
| Example 13 | Example 4 | Sodium hexametaphosphate | 1.15 | 650 | 360 | 0.29 | 7.6 | 0.59 | 426 | 83.0 |
| Example 14 | Example 5 | Sodium hexametaphosphate | 1.15 | 320 | 360 | 0.30 | 7.9 | 0.61 | 434 | 81.1 |
| Example 15 | Example 6 | Sodium hexametaphosphate | 1.15 | 320 | 360 | 0.29 | 7.8 | 0.66 | 425 | 80.0 |
| Example 16 | Example 7 | Sodium hexametaphosphate | 1.15 | 320 | 360 | 0.14 | 7.5 | 0.67 | 366 | 83.2 |
| Comparative Example 4 | Comparative Example 1 | Sodium hexametaphosphate | 1.15 | 320 | 360 | 0.32 | 5.6 | 0.31 | 396 | 83.9 |
| Comparative Example 5 | Comparative Example 2 | Sodium hexametaphosphate | 1.15 | 320 | 360 | 0.27 | 4.9 | 0.36 | 367 | 83.8 |
| Comparative Example 6 | Comparative Example 3 | Sodium hexametaphosphate | 1.15 | 320 | 360 | 0.12 | 4.7 | 0.39 | 323 | 84.3 |

TABLE 4

| Examples & Comparative Examples | Acicular magnetite particles (Example No. & Comparative Example No.) | Acicular maghemite particles | | | | |
|---|---|---|---|---|---|---|
| | | Major axial diameter ($\mu$m) | Aspect ratio (major axial diameter/minor axial diameter) | Particle size distribution ($\sigma_g$) | Coercive force Hc (Oe) | Saturation magnetization $\sigma_s$ (emu/g) |
| Example 17 | Example 8 | 0.17 | 7.8 | 0.65 | 354 | 73.6 |
| Example 18 | Example 9 | 0.15 | 8.1 | 0.54 | 367 | 69.8 |
| Example 19 | Example 10 | 0.18 | 8.6 | 0.58 | 370 | 73.2 |
| Example 20 | Example 11 | 0.25 | 6.9 | 0.57 | 371 | 74.8 |
| Example 21 | Example 12 | 0.14 | 7.3 | 0.57 | 355 | 72.9 |
| Example 22 | Example 13 | 0.27 | 7.7 | 0.58 | 390 | 73.0 |
| Example 23 | Example 14 | 0.29 | 7.7 | 0.60 | 403 | 71.4 |
| Example 24 | Example 15 | 0.27 | 7.7 | 0.65 | 398 | 70.0 |
| Example 25 | Example 16 | 0.13 | 7.4 | 0.67 | 330 | 73.5 |
| Comparative Example 7 | Comparative Example 4 | 0.31 | 5.4 | 0.30 | 365 | 74.0 |
| Comparative Example 8 | Comparative Example 5 | 0.26 | 4.8 | 0.35 | 338 | 73.9 |
| Comparative Example 9 | Comparative Example 6 | 0.11 | 4.6 | 0.38 | 280 | 74.5 |

TABLE 5

| Examples & Comparative Examples | Precursor particles (Example No. & Comparative Example No.) | Production of acicular magnetite particles modified with Co or Co and $Fe^{2+}$ | | | | Acicular magnetite particles modified with Co or Co and $Fe^{2+}$ | | | | |
|---|---|---|---|---|---|---|---|---|---|---|
| | | Amount of Co added (mol) | Amount of $Fe^{2+}$ added (mol) | Amount of caustic alkali added (ml) | Temperature (°C.) | Major axial diameter ($\mu$m) | Aspect ratio (major axial diameter/minor axial diameter) | Particle size distribution ($\sigma_g$) | Coercive force Hc (Oe) | Saturation magnetization $\sigma_s$ (emu/g) |
| Example 26 | Example 14 | 0.085 | 0.179 | 102 | 100 | 0.28 | 7.1 | 0.56 | 803 | 83.1 |
| Example 27 | Example 14 | 0.0509 | 0.179 | 98 | 100 | 0.28 | 7.2 | 0.56 | 705 | 84.5 |
| Example 28 | Example 14 | 0.0509 | 0.179 | 170 | 100 | 0.28 | 7.2 | 0.57 | 735 | 83.5 |

TABLE 5-continued

| Examples & Comparative Examples | Precursor particles (Example No. & Comparative Example No.) | Production of acicular magnetite particles modified with Co or Co and $Fe^{2+}$ | | | | Acicular magnetite particles modified with Co or Co and $Fe^{2+}$ | | | | |
|---|---|---|---|---|---|---|---|---|---|---|
| | | Amount of Co added (mol) | Amount of $Fe^{2+}$ added (mol) | Amount of caustic alkali added (ml) | Temperature (°C.) | Major axial diameter (μm) | Aspect ratio (major axial diameter/minor axial diameter) | Particle size distribution ($\sigma_g$) | Coercive force Hc (Oe) | Saturation magnetization $\sigma_s$ (emu/g) |
| Example 29 | Example 14 | 0.0509 | 0.1074 | 162 | 100 | 0.27 | 7.4 | 0.58 | 692 | 83.6 |
| Example 30 | Example 14 | 0.0509 | — | 150 | 100 | 0.27 | 7.6 | 0.59 | 650 | 79.1 |
| Example 31 | Example 8 | 0.085 | 0.179 | 102 | 100 | 0.16 | 6.4 | 0.64 | 850 | 85.7 |
| Example 32 | Example 9 | 0.085 | 0.179 | 102 | 100 | 0.14 | 6.8 | 0.63 | 845 | 82.7 |
| Example 33 | Example 10 | 0.085 | 0.179 | 102 | 100 | 0.16 | 7.1 | 0.59 | 843 | 85.5 |
| Example 34 | Example 11 | 0.085 | 0.179 | 102 | 100 | 0.23 | 6.0 | 0.56 | 824 | 86.8 |
| Example 35 | Example 12 | 0.085 | 0.179 | 102 | 100 | 0.13 | 6.3 | 0.54 | 820 | 85.1 |
| Example 36 | Example 13 | 0.085 | 0.179 | 102 | 100 | 0.27 | 6.7 | 0.56 | 820 | 85.2 |
| Example 37 | Example 15 | 0.085 | 0.179 | 102 | 100 | 0.26 | 7.0 | 0.64 | 807 | 82.4 |
| Example 38 | Example 16 | 0.085 | 0.179 | 102 | 100 | 0.11 | 6.1 | 0.65 | 856 | 85.4 |
| Comparative Example 10 | Comparative Example 4 | 0.085 | 0.179 | 102 | 100 | 0.29 | 5.2 | 0.30 | 795 | 85.9 |
| Comparative Example 11 | Comparative Example 5 | 0.085 | 0.179 | 102 | 100 | 0.25 | 4.6 | 0.34 | 797 | 86.7 |
| Comparative Example 12 | Comparative Example 6 | 0.085 | 0.179 | 102 | 100 | 0.10 | 4.3 | 0.38 | 780 | 86.0 |

TABLE 6

| Examples & Comparative Examples | Precursor particles (Example No. & Comparative Example No.) | Production of acicular maghemite particles modified with Co or Co and $Fe^{2+}$ | | | | Acicular maghemite particles modified with Co or Co and $Fe^{2+}$ | | | | |
|---|---|---|---|---|---|---|---|---|---|---|
| | | Amount of Co added (mol) | Amount of $Fe^{2+}$ added (mol) | Amount of caustic alkali added (ml) | Temperature (°C.) | Major axial diameter (μm) | Aspect ratio (major axial diameter/minor axial diameter) | Particle size distribution ($\sigma_g$) | Coercive force Hc (Oe) | Saturation magnetization $\sigma_s$ (emu/g) |
| Example 39 | Example 23 | 0.085 | 0.179 | 102 | 100 | 0.27 | 7.0 | 0.56 | 779 | 76.3 |
| Example 40 | Example 23 | 0.0509 | 0.179 | 98 | 100 | 0.28 | 7.0 | 0.56 | 685 | 77.4 |
| Example 41 | Example 23 | 0.0509 | 0.179 | 170 | 100 | 0.27 | 7.1 | 0.57 | 714 | 77.6 |
| Example 42 | Example 23 | 0.0509 | 0.1074 | 162 | 100 | 0.26 | 7.2 | 0.58 | 670 | 75.4 |
| Example 43 | Example 23 | 0.0509 | — | 150 | 100 | 0.25 | 7.5 | 0.59 | 626 | 69.8 |
| Example 44 | Example 17 | 0.085 | 0.179 | 102 | 100 | 0.15 | 6.2 | 0.62 | 831 | 78.5 |
| Example 45 | Example 18 | 0.085 | 0.179 | 102 | 100 | 0.12 | 6.6 | 0.52 | 822 | 75.0 |
| Example 46 | Example 19 | 0.085 | 0.179 | 102 | 100 | 0.15 | 6.9 | 0.56 | 820 | 78.1 |
| Example 47 | Example 20 | 0.085 | 0.179 | 102 | 100 | 0.22 | 5.8 | 0.54 | 802 | 79.2 |
| Example 48 | Example 21 | 0.085 | 0.179 | 102 | 100 | 0.11 | 6.2 | 0.54 | 802 | 77.6 |
| Example 49 | Example 22 | 0.085 | 0.179 | 102 | 100 | 0.25 | 6.6 | 0.56 | 798 | 78.1 |
| Example 50 | Example 24 | 0.085 | 0.179 | 102 | 100 | 0.25 | 6.8 | 0.63 | 785 | 75.1 |
| Example 51 | Example 25 | 0.085 | 0.179 | 102 | 100 | 0.09 | 6.0 | 0.65 | 829 | 78.1 |

TABLE 6-continued

| Examples & Comparative Examples | Precursor particles (Example No. & Comparative Example No.) | Production of acicular maghemite particles modified with Co or Co and $Fe^{2+}$ | | | | Acicular maghemite particles modified with Co or Co and $Fe^{2+}$ | | | | |
|---|---|---|---|---|---|---|---|---|---|---|
| | | Amount of Co added (mol) | Amount of $Fe^{2+}$ added (mol) | Amount of caustic alkali added (ml) | Temperature (°C) | Major axial diameter (μm) | Aspect ratio (major axial diameter/minor axial diameter) | Particle size distribution ($\sigma_g$) | Coercive force Hc (Oe) | Saturation magnetization $\sigma_s$ (emu/g) |
| Comparative Example 13 | Comparative Example 7 | 0.085 | 0.179 | 102 | 100 | 0.27 | 5.3 | 0.29 | 755 | 79.5 |
| Comparative Example 14 | Comparative Example 8 | 0.085 | 0.179 | 102 | 100 | 0.24 | 4.5 | 0.34 | 750 | 79.4 |
| Comparative Example 15 | Comparative Example 9 | 0.085 | 0.179 | 102 | 100 | 0.09 | 4.3 | 0.37 | 747 | 79.2 |

TABLE 7

| Examples & Comparative Examples | Magnetic particles (Example No. & Comparative Example No.) | Tape properties | | | |
|---|---|---|---|---|---|
| | | S.F.D. | Squareness (Br/Bm) | Coercive force Hc (Oe) | Residual flux density Br (Gauss) |
| Example 52 | Example 8 | 0.50 | 0.81 | 355 | 1610 |
| Example 53 | Example 9 | 0.52 | 0.81 | 368 | 1570 |
| Example 54 | Example 10 | 0.48 | 0.83 | 369 | 1620 |
| Example 55 | Example 11 | 0.45 | 0.78 | 370 | 1510 |
| Example 56 | Example 12 | 0.54 | 0.79 | 353 | 1560 |
| Example 57 | Example 13 | 0.44 | 0.83 | 392 | 1610 |
| Example 58 | Example 14 | 0.43 | 0.86 | 395 | 1580 |
| Example 59 | Example 15 | 0.42 | 0.85 | 394 | 1550 |
| Example 60 | Example 16 | 0.66 | 0.78 | 340 | 1520 |
| Comparative Example 16 | Comparative Example 4 | 0.67 | 0.72 | 362 | 1390 |
| Comparative Example 17 | Comparative Example 5 | 0.61 | 0.66 | 335 | 1260 |
| Comparative Example 18 | Comparative Example 6 | 0.75 | 0.68 | 292 | 1340 |

TABLE 8

| Examples & Comparative Examples | Magnetic particles (Example No. & Comparative Example No.) | Tape properties | | | |
|---|---|---|---|---|---|
| | | S.F.D. | Squareness (Br/Bm) | Coercive force Hc (Oe) | Residual flux density Br (Gauss) |
| Example 61 | Example 17 | 0.40 | 0.84 | 330 | 1440 |
| Example 62 | Example 18 | 0.41 | 0.84 | 345 | 1310 |
| Example 63 | Example 19 | 0.39 | 0.86 | 348 | 1410 |
| Example 64 | Example 20 | 0.36 | 0.81 | 350 | 1480 |
| Example 65 | Example 21 | 0.44 | 0.83 | 353 | 1360 |
| Example 66 | Example 22 | 0.35 | 0.85 | 369 | 1400 |
| Example 67 | Example 23 | 0.33 | 0.88 | 378 | 1370 |
| Example 68 | Example 24 | 0.32 | 0.88 | 377 | 1320 |
| Example 69 | Example 25 | 0.45 | 0.79 | 310 | 1280 |
| Example 19 | Example 7 | 0.58 | 0.75 | 332 | 1210 |
| Example 20 | Example 8 | 0.70 | 0.69 | 305 | 1100 |
| Example 21 | Example 9 | 0.67 | 0.71 | 258 | 1160 |

TABLE 9

| Examples & Comparative Examples | Magnetic particles (Example No. & Comparative Example No.) | Tape properties | | | |
|---|---|---|---|---|---|
| | | S.F.D. | Squareness (Br/Bm) | Coercive force Hc (Oe) | Residual flux density Br (Gauss) |
| Example 70 | Example 26 | 0.46 | 0.86 | 831 | 1620 |
| Example 71 | Example 27 | 0.43 | 0.86 | 730 | 1650 |
| Example 72 | Example 28 | 0.42 | 0.87 | 764 | 1645 |
| Example 73 | Example 29 | 0.39 | 0.88 | 713 | 1670 |

TABLE 9-continued

| Examples & Comparative Examples | Magnetic particles (Example No. & Comparative Example No.) | Tape properties | | | |
|---|---|---|---|---|---|
| | | S.F.D. | Squareness (Br/Bm) | Coercive force Hc (Oe) | Residual flux density Br (Gauss) |
| Example 74 | Example 30 | 0.37 | 0.89 | 681 | 1595 |
| Example 75 | Example 31 | 0.53 | 0.81 | 870 | 1570 |
| Example 76 | Example 32 | 0.55 | 0.80 | 863 | 1500 |
| Example 77 | Example 33 | 0.51 | 0.83 | 865 | 1610 |
| Example 78 | Example 34 | 0.49 | 0.79 | 840 | 1555 |
| Example 79 | Example 35 | 0.57 | 0.78 | 839 | 1510 |
| Example 80 | Example 36 | 0.46 | 0.83 | 842 | 1600 |
| Example 81 | Example 37 | 0.45 | 0.84 | 829 | 1570 |
| Example 82 | Example 38 | 0.58 | 0.77 | 871 | 1490 |
| Comparative Example 22 | Comparative Example 10 | 0.69 | 0.71 | 710 | 1380 |
| Comparative Example 23 | Comparative Example 11 | 0.65 | 0.65 | 805 | 1290 |
| Comparative Example 24 | Comparative Example 12 | 0.77 | 0.67 | 793 | 1310 |

TABLE 10

| Examples & Comparative Examples | Magnetic particles (Example No. & Comparative Example No.) | Tape properties | | | |
|---|---|---|---|---|---|
| | | S.F.D. | Squareness (Br/Bm) | Coercive force Hc (Oe) | Residual flux density Br (Gauss) |
| Example 83 | Example 39 | 0.36 | 0.87 | 807 | 1540 |
| Example 84 | Example 40 | 0.35 | 0.88 | 710 | 1580 |
| Example 85 | Example 41 | 0.34 | 0.88 | 740 | 1590 |
| Example 86 | Example 42 | 0.31 | 0.90 | 690 | 1580 |
| Example 87 | Example 43 | 0.30 | 0.90 | 650 | 1460 |
| Example 88 | Example 44 | 0.43 | 0.82 | 852 | 1495 |
| Example 89 | Example 45 | 0.44 | 0.82 | 843 | 1430 |
| Example 90 | Example 46 | 0.41 | 0.85 | 846 | 1540 |
| Example 91 | Example 47 | 0.38 | 0.82 | 824 | 1510 |
| Example 92 | Example 48 | 0.47 | 0.80 | 816 | 1440 |
| Example 93 | Example 49 | 0.38 | 0.85 | 820 | 1540 |
| Example 94 | Example 50 | 0.35 | 0.86 | 712 | 1500 |
| Example 95 | Example 51 | 0.47 | 0.79 | 848 | 1430 |
| Comparative Example 25 | Comparative Example 13 | 0.56 | 0.74 | 770 | 1360 |
| Corhparative Example 26 | Comparative Example 14 | 0.68 | 0.67 | 757 | 1210 |
| Comparative Example 27 | Comparative Example 15 | 0.69 | 0.70 | 760 | 1290 |

What is claimed is:

1. A process for producing acicular goethite particles having an aspect ratio of not less than 20 comprising the step of blowing an oxygen-containing gas into a ferrous salt reaction solution containing either colloidal ferrous hydroxide which is obtained by reacting an aqueous ferrous salt solution with less than one equivalent of an aqueous hydroxide solution based on $Fe^{2+}$ in said aqueous ferrous salt solution or iron-containing colloidal precipitates which are obtained by reacting an aqueous ferrous salt solution with less than one equivalent of an aqueous alkali carbonate solution or an aqueous hydroxide and carbonate solution based on $Fe^{2+}$ in said aqueous ferrous salt solution, at a temperature not higher than 80° C. so as to oxidize said colloidal ferrous hydroxide or iron-containing colloidal precipitates and to produce acicular goethite particles through green rust which is produced at a pH of 5 to 7, wherein from 0.01 to 5.0 mol % ascorbic acid or a salt thereof calculated as ascorbic acid based on Fe in the ferrous salt reaction solution is present before said acicular goethite particles are produced.

2. The process according to claim 1, wherein 0.1 to 7.0 mol % of a zinc compound based on Fe in the ferrous salt reaction solution is also present in addition to said ascorbic acid or a salt thereof.

3. A process for producing acicular magnetic iron oxide particles comprising the step of:

heat-treating in a reducing gas the acicular goethite particles obtained by the process according to claim 1, or acicular hematite particles which are obtained by heat-treating at 300° to 700° C. said acicular goethite particles obtained by the process according to claim 1, thereby producing acicular magnetite particles.

4. The process according to claim 3, further comprising the additional step of oxidizing the acicular magnetite particles, thereby producing acicular maghemite particles.

5. A process for producing acicular magnetic iron oxide particles comprising the steps of:

dispersing the acicular magnetite particles obtained according to claim 3 or acicular maghemite particles obtained according to claim 4 as precursor particles in an alkaline suspension containing either cobalt hydroxide or cobalt hydroxide and ferrous hydroxide so that the Co content in said suspension is 0.1 to 21.0 atomic % based on Fe of said precursor particles; and heat-treating at a temperature of 50° to 100° the resultant aqueous dispersion, thereby obtaining acicular magnetite particles or acicular maghemite particles modified with Co or Co and $Fe^{2+}$.

6. A process for producing acicular goethite particles having an aspect ratio of not less than 2 comprising the steps of:
(a) blowing an oxygen-containing gas into a ferrous salt reaction solution containing either colloidal ferrous hydroxide which is obtained by reacting an aqueous ferrous salt solution with less than one equivalent of an aqueous hydroxide solution based on $Fe^{2+}$ in said aqueous ferrous salt solution or iron-containing colloidal precipitates which are obtained by reacting an aqueous ferrous salt solution with less than one equivalent of an aqueous alkali carbonate solution or an aqueous hydroxide and carbonate solution based on $Fe^{2+}$ in said aqueous ferrous salt solution, at a temperature not higher than 80° C. so as to oxidize said colloidal ferrous hydroxide or iron-containing colloidal precipitates and to produce acicular goethite nucleus particles through green rust which is produced at a pH of 5 to 7, wherein from 0.01 to 5.0 mol % ascorbic acid or a salt thereof calculated as ascorbic acid based on Fe in the ferrous salt reaction solution is present before said acicular goethite nucleus particles are produced; and
(b) growing said acicular goethite nucleus particles by blowing an oxygen containing gas into the ferrous salt reaction solution containing not less than 10 mol % of the acicular goethite nucleus particles based on the total amount of goethite particles produced in the process at (1) a pH of 3 to 6 at a temperature less than 90° C., (2) a pH of 8 to 10 at a temperature less than 80°, or (3) a pH not less than 11 at a temperature less than 80° C., so as to produce acicular goethite particles.

7. The process according to claim 6, wherein 0.1 to 7.0 mol % of a zinc compound based on Fe in the ferrous salt reaction solution is also present in addition to said ascorbic acid or a salt thereof.

8. The process according to claim 6, wherein the growth reaction is conducted at a temperature of 30° to 55° C. according to the procedure (2) or (3).

9. The process according to claim 6, wherein the growth reaction is conducted at a temperature of 30° to 90° C. according to the procedure (1).

10. A process for producing acicular magnetic iron oxide particles comprising the step of:
heat-treating in a reducing gas, the acicular goethite particles obtained by the process according to claim 6, or acicular hematite particles which are obtained by heat-treating at 300° to 700° C. said acicular goethite particles obtained by the process according to claim 6, thereby producing acicular magnetite particles.

11. The process according to claim 10, further comprising the additional step of oxidizing the acicular magnetite particles, thereby producing acicular maghemite particles.

12. A process for producing acicular magnetic iron oxide particles comprising the steps of:
dispersing the acicular magnetite particles obtained according to claim 10 or acicular maghemite particles obtained according to claim 11 as precursor particles in an alkaline suspension containing either cobalt hydroxide or cobalt hydroxide and ferrous hydroxide so that the Co content in said suspension is 0.1 to 21.0 atomic % based on Fe of said precursor particles; and
heat-treating at a temperature of 50° to 100° C. the resultant aqueous dispersion, thereby obtaining acicular magnetite particles or acicular maghemite particles modified with Co or Co and $Fe^{2+}$.

* * * * *